(12) United States Patent
Woo et al.

(10) Patent No.: US 6,791,071 B2
(45) Date of Patent: Sep. 14, 2004

(54) APPARATUS FOR MEASURING APERTURE SIZE OF NEAR-FIELD OPTICAL PROBE AND METHOD THEREOF

(75) Inventors: Gi-myung Woo, Suwon (KR); Petrov Nikolai, Suwon (KR); Myung-bok Lee, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 203 days.

(21) Appl. No.: 10/242,723

(22) Filed: Sep. 13, 2002

(65) Prior Publication Data

US 2003/0057352 A1 Mar. 27, 2003

(30) Foreign Application Priority Data

Sep. 18, 2001 (KR) ........................................ 2001-57575

(51) Int. Cl.$^7$ ................................................. G02B 7/04
(52) U.S. Cl. .................................... 250/201.3; 250/216
(58) Field of Search .......................... 250/201.3, 214.1, 250/216, 226, 306, 307

(56) References Cited

U.S. PATENT DOCUMENTS 4,086,491 A * 4/1978 Vaughan ..................... 250/397

* cited by examiner

*Primary Examiner*—Que T. Le
(74) *Attorney, Agent, or Firm*—Sughrue Mion, PLLC

(57) ABSTRACT

An apparatus and method for measuring an aperture of a near-field optical probe is provided. The apparatus includes a light source, an optical detector, and a filter. The light source radiates light to the near-field optical probe. The optical detector is positioned before the near-field optical probe and receives the light transmitted through the near-field optical probe to detect light intensity. The filter is disposed between the light source and the optical detector and transmits only light of wavelengths in a specific mode from the light transmitted through the near-field optical probe. Thus, an aperture diameter of the near-field optical probe can accurately be measured in real-time without damaging the near-field optical probe.

27 Claims, 10 Drawing Sheets

APPARATUS FOR MEASURING APERTURE SIZE OF NEAR-FIELD OPTICAL PROBE AND METHOD THEREOF

BACKGROUND OF THE INVENTION

1. Field of the Invention

The present invention relates to an apparatus and method for measuring an aperture size of a near-field optical probe, and more particularly, to an apparatus and method for measuring an accurate aperture diameter of a near-field optical probe using a filter. The present application is based on Korean Patent Application No. 2001-57575, which is incorporated herein by reference.

2. Description of the Related Art

Near-field optical probes are generally used in apparatuses for near-field optical microscopy such as high resolution apparatuses for measuring material surfaces or super-high density recording media.

In an apparatus for measuring resolution of a material surface, resolution R is defined as the distance between two points that can be resolved and is given by equation 1, wherein the resolution R is proportional to a wavelength $\lambda$ and inversely proportional to an aperture diameter of a lens or an iris.

$$R = \frac{1.22\lambda}{D} \quad (1)$$

In conventional far-field optical microscopy, resolution has to be small as the wavelength of light becomes shorter. However, there is a limit beyond which the resolution cannot be made small due to the diffraction of light. This diffraction limit is not encountered in near-field scanning optical microscopy (hereinafter referred to as "NSOM"). Thus, it is possible to manufacture a high resolution apparatus for measuring a material surface.

In NSOM, it is necessary to accurately know an aperture size of a near-field optical probe in order to measure high resolution of a sample which is positioned at the near-field optical probe of a size smaller than a wavelength, i.e., a sub-wavelength size, using a near-field optical microscope.

An aperture diameter of the optical probe in the NSOM has a subwavelength-size, i.e., a diameter d of about 50–300 nm in near-field optical microscopy using a visible ray with a wavelength $\lambda$ of 400–1000 nm. This subwavength resolution can be achieved when the sample is positioned at the near-field optical probe.

Conventional NSOM uses a scanning electron microscope (SEM) or a measurement only apparatus (disclosed in U.S. Pat. No. 5,663,798) in order to obtain the aperture diameter of the optical probe.

SEM reduces an electron beam generated from an electron gun to a diameter within a range of several to hundreds Å, using several electron lenses, radiates it onto a sample, detects secondary electrons emitted from the sample or electrons having passed through the sample, modulates brightness in time series on an oscilloscope, and measures the surface of the sample.

SEM can accurately measure an aperture of an optical probe, but it is expensive and takes a long time.

To measure the aperture of an optical probe using SEM, the tip of the optical probe, which is an electrical insulator, has to be coated with a conductive material. When the aperture of the coated optical probe is measured and then the coated optical probe is used in NSOM, the coating of the tip of the optical probe degrades the performance of NSOM. Thus, since it is difficult to reuse the optical probe measured with SEM, a new optical probe should be used in NSOM. However, the new optical probe may have a different diameter than the optical probe measured with SEM.

FIG. 1 is a schematic view of an apparatus for measuring an aperture size of an optical probe disclosed in U.S. Pat. No. 5,663,798. Referring to FIG. 1, the apparatus includes a light source 11 for radiating light, a polarizer 13 for polarizing the light, a focusing lens 15 for focusing the light onto an optical probe 10, a linear analyzer 17 for collecting light transmitted through the optical probe 10 through an optical detector 19, and the optical detector 19 for converting the light into an electrical signal and detecting the electrical signal.

In the apparatus, to deduce an aperture diameter, the light transmitted through the aperture of the optical probe 10 at a predetermined angle is received, a signal corresponding to light intensity is detected from the optical detector 19, and the signal is transmitted to a data acquisition unit (DAU) 23 or a computer (PC) 25.

As shown in FIG. 1, a motor 21 in which the linear analyzer 17 and the optical detector 19 are built rotates from −165° to +165° to measure the angular light intensity distribution emitted from the aperture in far-field. As a result, the aperture diameter of the optical probe can be measured.

FIG. 2 is a graph showing an angular distribution light intensity measured by the conventional aperture measuring apparatus. Referring to FIG. 2, if the wavelength of the light emitted from the light source 11 is 633 nm and a polarization angle is 90°, the far-field angular intensity distribution of light transmitted through the optical probe having an aperture diameter of 60 nm, 380 nm, or 3.2 $\mu$m (which is pre-measured with SEM) is gaussian with a maximum light intensity value at 0°.

As can be seen from FIG. 2, as the aperture diameter decreases, a full width at half maximum (FWHM) becomes increasingly wider. Here, the FWHM is the difference between two angles corresponding to half of the maximum light intensity value.

Referring to FIG. 2, if an aperture diameter d (=2a) of the optical probe is 60 nm, the FWHM is the difference between two angles +60° and −60° corresponding to the light intensity of 0.5, i.e., 120°. If the aperture diameter d (=2a) of the optical probe is 380 nm, the FWHM is the difference between +30° and −30°, i.e., 60°.

FIG. 3 is a graph of FWHM according to aperture diameters of the optical probe with reference to FIG. 2. In FIG. 3, the line (a) is predicted based on Kirchoff's theory, the line (b) is given by the small aperture limit theory of Bethe, and the line (c) is that given by the conventional measuring apparatus.

The aperture diameter of an optical probe can be obtained by obtaining the FWHM from the intensity distribution of the light emitted from the optical probe using FIG. 3 and then finding the corresponding diameter from FIG. 2.

The apparatus shown in FIG. 2 requires an additional unit which rotates around the optical probe to measure the light intensity transmitted through the optical probe. And, if the rotation of the apparatus is not precise, it is difficult to measure an accurate aperture diameter. Also, since it is difficult to position the tip of the optical probe accurately at the center of rotation, errors easily occur when measuring the aperture diameter.

Moreover, the light intensity should be measured and graphed at a plurality of angles with the rotation of the motor. Thus, it takes a long time to measure aperture diameters and it is difficult to measure aperture diameters smaller than $\lambda/6$ due to measurement limit actions of the apparatus.

SUMMARY OF THE INVENTION

To solve the above-described problems, it is an object of the present invention to provide an apparatus for accurately measuring the aperture of an optical probe without damaging the optical probe which can easily be manufactured and configured, and a method thereof.

Accordingly, to achieve the above object, there is provided an apparatus for measuring an aperture of a near-field optical probe. The apparatus includes a light source, an optical detector, and a filter. The light source radiates light to the near-field optical probe. The optical detector is positioned before the near-field optical probe and receives the light transmitted through the near-field optical probe to detect light intensity. The filter is prepared between the light source and the optical detector and transmits only light of wavelengths in a specific mode from the light transmitted through the near-field optical probe.

Here, if a free space or a medium exists between the light source and the filter, the specific mode is a Bessel Gauss mode.

The free space, which has a refractive index of 1, is one of media having uniform refractive indexes.

To achieve the above object, there is provided an apparatus for measuring an aperture of a near-field optical probe. The apparatus includes a light source, an optical detector, a filter, and an optical waveguide. The light source radiates light to the near-field optical probe. The optical detector is positioned before the near-field optical probe and receives the light transmitted through the near-field optical probe to detect light intensity. The filter is prepared between the light source and the optical detector and transmits only light of wavelengths in a specific mode from the light transmitted through the near-field optical probe. The optical waveguide is disposed between the near-field optical probe and the filter and transmits the light.

If the optical waveguide is a graded-index waveguide, the specific mode is Hermite-Gauss mode.

The specific mode is a Laguerre-Gauss mode if the optical waveguide is a graded-index fiber.

The specific mode is a step-index waveguide mode or a step-index fiber mode if the optical waveguide is a step-index waveguide or a step-index fiber.

To achieve the above object, there is provided an apparatus for measuring an aperture of a near-field optical probe. The apparatus includes a light source, an optical detector, a filter, and a mask. The light source radiates light to the near-field optical probe. The optical detector is positioned before the near-field optical probe, and receives the light transmitted through the near-field optical probe to detect light intensity. The filter is prepared between the light source and the optical detector and transmits only light of wavelengths in a specific mode from the light transmitted through the near-field optical probe. The mask is disposed between the light source and the filter and has a cavity in the center through which the light passes.

The specific mode is a mask mode.

To achieve the above object, there is provided a method of measuring an aperture of a near-field optical probe using a filter for transmitting light in a specific mode. The method includes steps: (a) radiating light having a predetermined wavelength to an optical probe; (b) transmitting wavelengths in a specific mode from the light emitted from the near-field optical probe, using a filter; (c) detecting a first light intensity value from a first far-field light intensity distribution of light of wavelength having a mode number of zero from the light transmitted through the filter; (d) detecting a second light intensity value from a second far-field light intensity distribution of light of wavelength having a mode number not zero from the light transmitted through the filter; and (e) substituting a ratio of the first and second light intensity values in a predetermined equation with respect to an aperture diameter of the near-field optical probe to obtain the aperture diameter of the near-field optical probe.

Step (b) further includes transmitting the light transmitted through the near-field optical probe to the filter through a predetermined medium.

Here, if the predetermined medium has a uniform refractive index, the specific mode is a Bessel Gauss mode.

If the predetermined medium is a graded-index waveguide, the specific mode is a Hermite-Gauss mode.

If the predetermined medium is a graded-index fiber, the specific mode is a Laguerre-Gauss mode.

If the predetermined medium is a step-index waveguide or a step-index fiber, the specific mode is a step-index waveguide mode or a step-index fiber mode.

Step (b) may further include transmitting the light transmitted through the near-field optical probe to the filter through a mask having a cavity in the center. Here, the specific mode is a mask mode.

Step (d) may include obtaining a second light intensity value from a second far-field light intensity distribution of a wavelength having a mode number of 2 from the light transmitted through the filter.

Step (e) includes steps: (e-1) obtaining a mode solution corresponding to a specific mode according to a specific medium; (e-2) calculating a coupling constant corresponding to the mode solution and obtaining relationship equation with respect to the optical probe aperture diameter of the coupling constant; and (e-3) substituting a ratio of the first light intensity value measured in step (c) and the second light intensity value measured in step (d) for the relationship equation to deduce the aperture diameter of the near-field optical probe.

In step (e-1), the specific mode is a Hermite-Gauss mode if the specific medium is a graded-index waveguide.

In step (e-2), an equation with respect to the aperture diameter of the near-field optical probe of the coupling constant corresponding to the mode solution is obtained.

In step (e-3), the aperture diameter of the near-field optical probe can be deduced from a predetermined equation if the second light intensity value measured in step (d) corresponds to a wavelength having a mode number of 2.

When optical information is stored using an optical probe with an aperture diameter smaller than a wavelength of light or a sample is observed with a microscope having the optical probe, it is necessary to accurately know the aperture diameter of the optical probe to reproduce written information or an accurate image on the surface of the sample.

In the present invention, the aperture diameter can easily be measured in comparison to a conventional method of measuring an aperture diameter of a near-field optical probe, i.e., a method using a SEM or a separate measuring apparatus. Also, since the aperture diameter can be measured without damaging the near-field optical probe, a corresponding optical probe can be selected. Further, the configuration of the apparatus according to the present invention is simple compared to a conventional apparatus and the measuring cost can be reduced. Moreover, it is possible to measure aperture diameter sizes of λ/6 or less which are difficult to measure by a conventional method.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, embodiments of an apparatus for measuring an aperture diameter of a near-field optical probe according to the present invention will be described with reference to the attached drawings.

Figure 1:
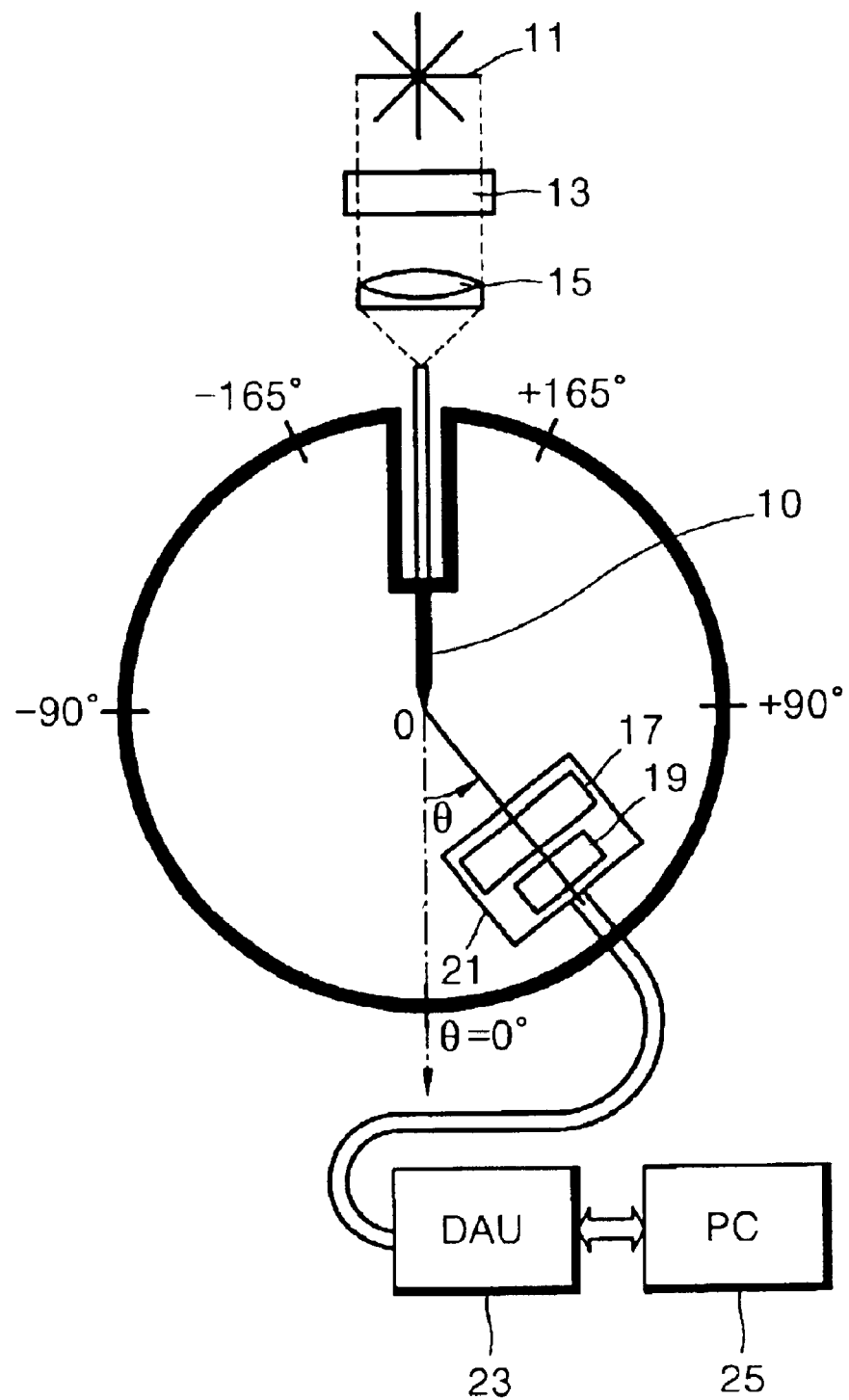
FIG. 1 is a cross-sectional view of a conventional apparatus for measuring an aperture of an optical probe.
Figure 2:
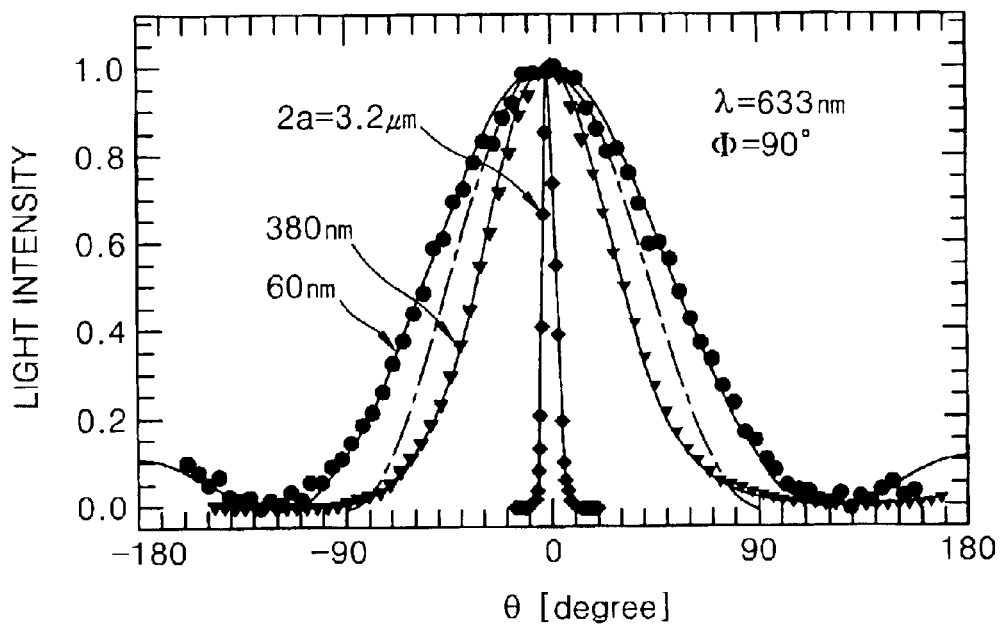
FIG. 2 is a graph showing the distribution of light intensity measured according to angles in the conventional apparatus shown in FIG. 1.
Figure 3:
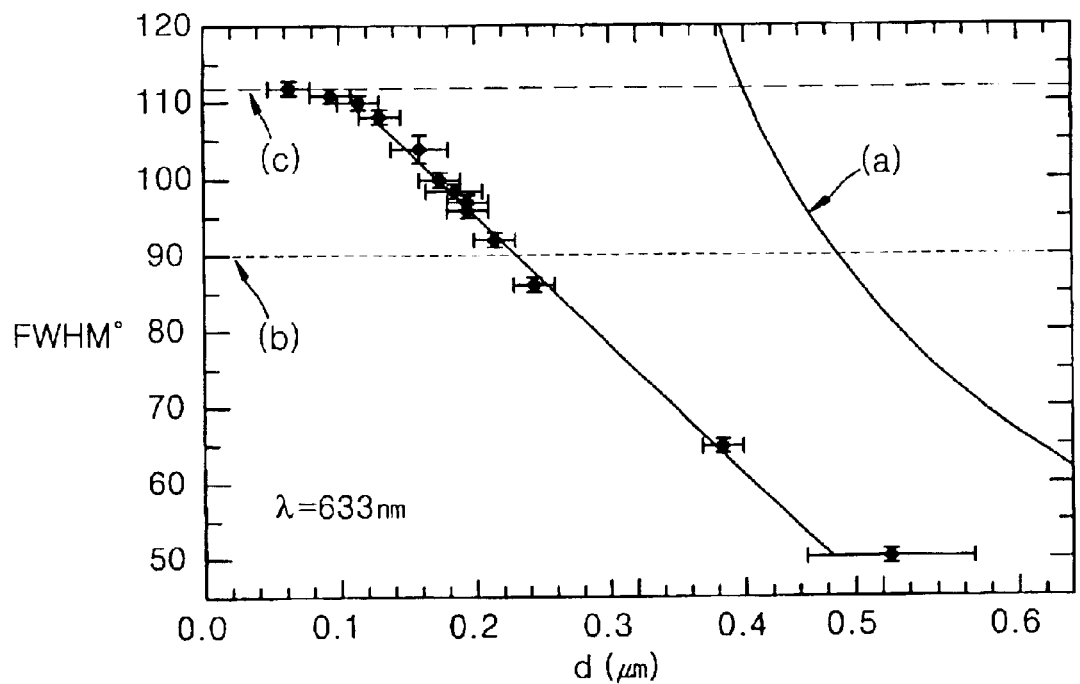
FIG. 3 is a graph showing FWHM according to aperture diameters of the optical probe in the conventional apparatus shown in FIG. 1.
Figure 4:
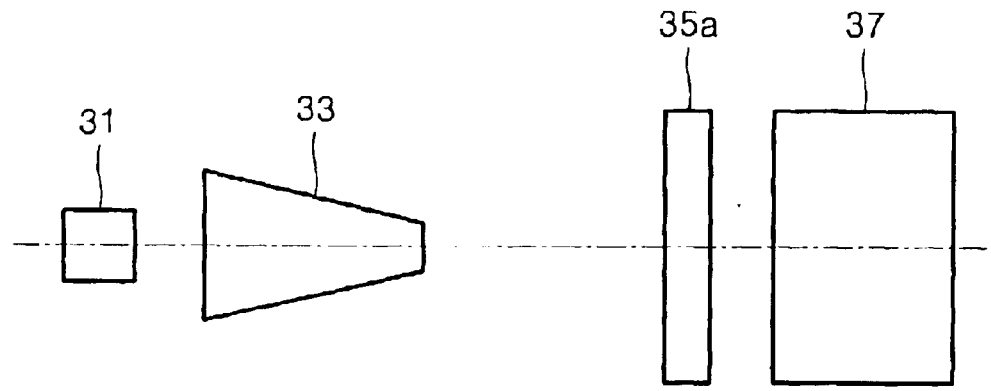
FIG. 4 is a schematic cross-sectional view of a first embodiment of the present invention.

FIG. 4 is a schematic cross-sectional view of a first embodiment of an apparatus for measuring an aperture of a near-field optical probe of the present invention. Referring to FIG. 4, the apparatus includes a light source 31, an optical detector 37, and a spatial mode filter (SMF) 35a. The light source 31 radiates light toward an optical probe 33. The optical detector 37 is positioned before the optical probe 33 and receives light transmitted through the optical probe 33 to detect light intensity. The SMF 35a is disposed between the light source 31 and the optical detector 37 and transmits only light of wavelengths of a specific mode from the light transmitted through the optical probe 33. Here, a uniform medium having a uniform refractive index may further be disposed between the optical probe 33 and the SMF 35a.

The light source 31 is a laser diode (LD), which uses a laser having a wavelength of about 630 nm as a light source if the aperture diameter of the optical probe is within a range of about 50–100 nm.

The optical probe 33 is a conical optical fiber, the tip of which is tapered and a clad layer of which is coated with aluminium. The aperture diameter of the near-field optical probe 33 has to be smaller than a wavelength emitted from the light source 31. This is to overcome diffraction limit due to the wavelength of the light. In other words, if a particle of the light is smaller than the wavelengths of the light, it is impossible to detect the particle due to the diffraction limit caused by the wavelength of the light. Thus, to detect the particles of the light smaller than the wavelength of the light, the light must be emitted through an optical probe having an aperture diameter smaller than the wavelength of the light.

The optical probe 33 is used in various fields such as a near-field optical microscopy, a laser, optical information storage, optical trapping, and the like. In particular, when the optical probe 33 is used in optical pick-up techniques for optical information storage, it is possible to manufacture an optical-recordable medium having much higher recording density than the information recording density of the optical probe 33 by obtaining an optical spot of a very small size.

The optical detector 37 is a general photo detector (PD). However, according to the media type disposed between the optical probe 33 and the SMF 35a, different optical detectors have to be used. For example, in the apparatus for measuring the aperture diameter of the optical probe according to the first embodiment of the present invention, a free space exists between the optical probe 33 and the SMF 35a. However, since the free space has a lower transmission efficiency of light than a waveguide or an optical fiber, it is necessary to prepare an optical detector having better performance.

The SMF 35a serves to transmit only light of wavelengths of a specific mode from the light based on the kind of the medium disposed between the optical probe 33 and the SMF 35a.

In the apparatus according to the first embodiment of the present invention, when a free space exists or a medium having a uniform refractive index is disposed between the optical probe 33 and the SMF 35a, the SMF 35a transmits only light of wavelengths having a Bessel Gauss mode.

In general, the propagation equation of the light transmitted through the medium is given by equation 1. Here, the medium is a homogeneous medium or an inhomogeneous medium having a gradually varying refractive index.

$$(\Delta^2 + k^2)\Psi(\vec{r}, z) = 0 \tag{1}$$

Equation 2 is Helmholtz equation for a spot smaller than the wavelength of the light on a starting plan z=0 formed by an optical probe which is coated or uncoated, i.e., a subwavelength-sized spot.

Here, the light emitted from the optical probe 33 propagates through a medium having well-known characteristics, e.g., uniform refractive index, a step-index waveguide, a step-index fiber, a graded-index waveguide, or a graded-index fiber. Thus, an accurate solution of the wave equation 1 can be obtained.

$$E(r, 0) = \sum_{m=0} c_m \Psi_m(r) \tag{2}$$

where $c_m$ is a mode constant and $\Psi_m$ is a mode solution. An electric field travels in a Z direction in the medium. Here, the propagation equation is given by equation 3.

$$E(r, z) = \sum_{m=0} c_m \Psi_m(r) \exp(i\beta z) \tag{3}$$

In case of the free space, a mode solution of wavelength in a Bessel Gauss mode obtained from a SMF 35a is represented by equation 4:

$$E(r, \Phi, z) = \sum_{m=-n}^{B} c_m J_m\left(\gamma_{m0} \frac{r}{R}\right) \exp(-im\Phi) \exp(i\beta z) \tag{4}$$

where $J_m$ is Bessel function.

Here, the mode constant $c_m$ is given by equation 5.

$$c_m = A_m \int \int E(r, \Phi, 0) J_m\left(\gamma_{m0} \frac{r}{R}\right) \exp(im\Phi) r\, dr\, d\Phi \tag{5}$$

where $Y_{m0}$ is a root of $J_m(x)=0$ and R is the radius of SMF in the free space. A predetermined relationship equation for the aperture diameter of the optical probe is deduced from the relationship between a coupling constant $c_m$ of equation 5 and a light intensity value detected from the detector to obtain the aperture diameter of the optical probe 33.

Figure 8:
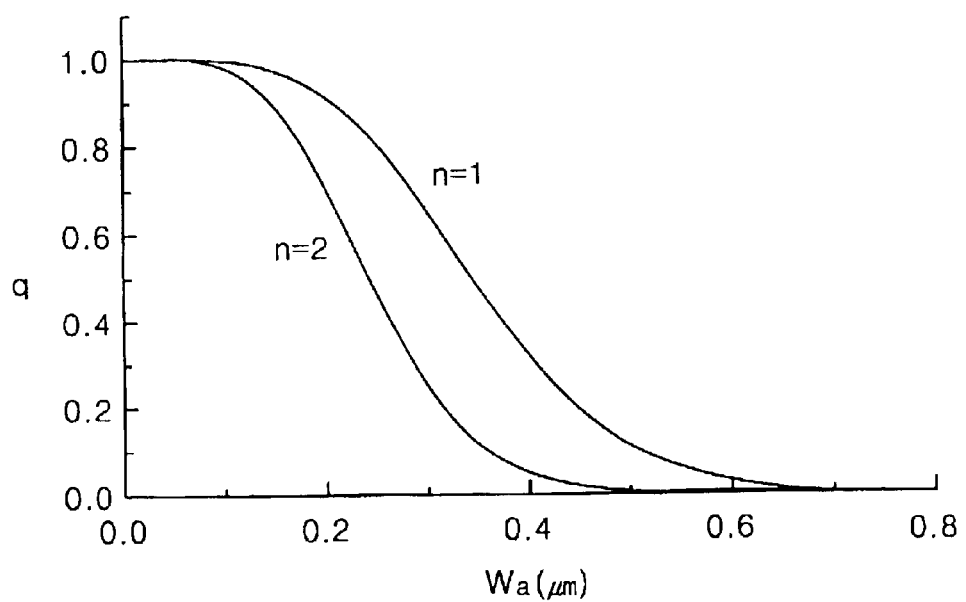
FIG. 8 is a graph showing the light mode intensity with respect to aperture diameters in different mode filters according to the first embodiment of the present invention.

FIG. 8 is a graph showing the light mode intensity q with respective to aperture diameters $w_a$ in a free space having a refractive index n of 1 or a medium having a refractive index n of 2. The wavelength λ of light used is 650 nm. Here, the radius R of the filter is 5 μm.

As can be seen from FIG. 8, if the aperture diameter wa is zero, the relative mode intensity q is 1. The light mode intensity q decreases with an increase in the size of the aperture. The aperture diameter has a value between 0–0.7 μm in the free space having the refractive index of 1, and has a value between 0–0.5 μm in the medium having the refractive index of 2. In other words, the slope of the mode intensity q increases with the refractive index n.

Figure 9:
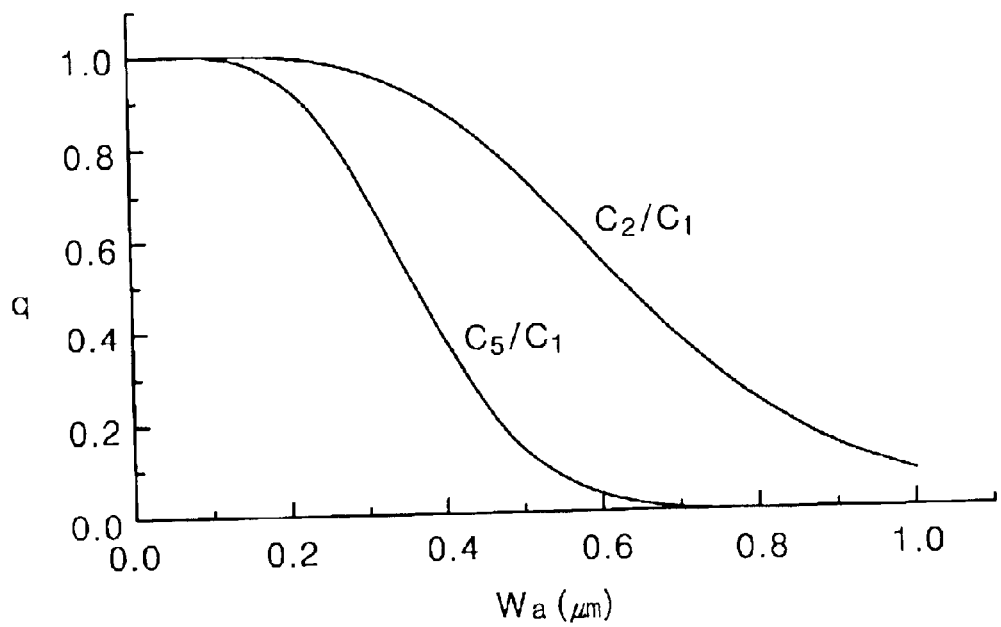
FIG. 9 is a graph showing mode constants with respect to the number of modes according to the second embodiment of the present invention.

FIG. 9 is a graph showing the light mode intensity q with respect to aperture diameters $w_a$ for ratios of different mode constants. Here, the refractive index n is 1 and the radius R of the filter is 5 μm. The graph shape shown in FIG. 9 is similar to the graph shape shown in FIG. 8. The slope of the mode intensity q for the constant ratio $c_5/c_1$ is higher than that of the mode intensity q for the constant ratio $C_2/c_1$. Sensitivity increases as the slope increases.

Figure 5:
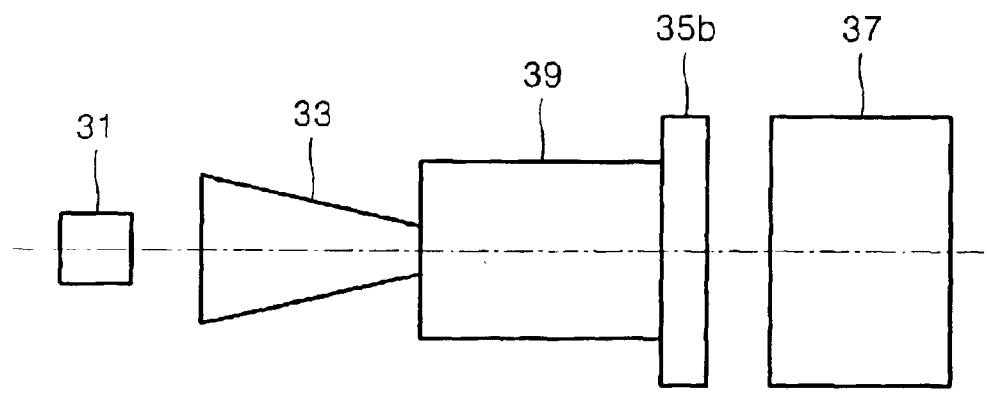
FIG. 5 is a schematic cross-sectional view of a second embodiment of the present invention.

FIG. 5 is a schematic cross-sectional view of an apparatus for measuring an aperture diameter of an optical probe according to the second embodiment of the present invention. Referring to FIG. 5, the apparatus includes a light source 31, an optical detector 37, a filter 35b, and an optical waveguide 39. The light source 31 radiates light toward an optical probe 33. The optical detector 37 is positioned before the optical probe 33 and receives the light transmitted through the optical probe 33 to detect light intensity. The filter 35b is disposed between the light source 31 and the optical detector 37, and transmits only light of wavelengths of a specific mode from the light transmitted through the optical probe 33. The optical waveguide 39 is disposed between the optical probe 33 and the filter 35b and transmits the light.

Here, the light source 31 and the optical detector 37 are identical to those described in the first embodiment in view of their structure and function, and thus their descriptions are omitted.

The optical waveguide 39, according to the second embodiment of the present, invention may be a graded-index waveguide, a graded-index fiber, a step-index waveguide, or a step-index fiber.

A refractive index n of the graded-index waveguide satisfies equation 6.

$$n^2(x) = n_0^2 - \omega^2 x^2 \tag{6}$$

where $n_0$ is a refractive index of the optical axis of the graded-index waveguide and $\omega$ is a refractive index with respect to a unit distance.

If the optical waveguide 39 according to the second embodiment of the present invention is a graded-index waveguide, the filter 35b transmits only wavelengths in a Hermite-Gauss mode. Here, the mode solution of Hermite-Gauss mode is given by equation 7.

$$\Psi_m(x) = \left[m! 2^m \left(\frac{\pi}{2}\right)^{1/2} w_0\right]^{-1/2} \exp\left(-\frac{x^2}{w_0^2}\right) H_m\left(\frac{\sqrt{2}x}{w_0}\right) \tag{7}$$

A coupling constant $c_m$ corresponding to the mode solution is obtained from equation 8 for a spot having a Gaussian intensity distribution.

$$c_m = \int E(x, z) \Psi_m(x) dx \tag{8}$$

$$c_{2n} = \frac{(-1)^n \sqrt{(2n)!}}{2^n n!} \sqrt{\frac{2 w_a w_0}{w_a^2 + w_0^2}} \left[\frac{w_0^2 - w_a^2}{w_a^2 + w_0^2}\right]^n, n = 0, 1, 2, 3 \ldots$$

The first and second order coefficients $c_0$ and $c_2$ are given by equation 9.

$$|c_0| = \sqrt{\frac{2 w_a w_0}{w_a^2 + w_0^2}}, |c_2| = \sqrt{\frac{w_a w_0}{w_a^2 + w_0^2}} \left(\frac{w_0^2 - w_a^2}{w_a^2 + w_0^2}\right) \tag{9}$$

The mode intensity ratio q can be obtained from $c_0$ and $c_2$ according to equation 10.

$$q = \frac{|c_2|}{|c_0|} = \sqrt{\frac{I_2}{I_0}} = \frac{1}{\sqrt{2}}\left(\frac{w_0^2 - w_a^2}{w_0^2 + w_a^2}\right) \quad (10)$$

The aperture diameter $w_a$ of the optical probe 33 is then obtained by solving equation 10 as follows.

$$w_a = w_0 \sqrt{\frac{1 - \sqrt{2q}}{1 + \sqrt{2q}}} \quad (11)$$

Figure 10:
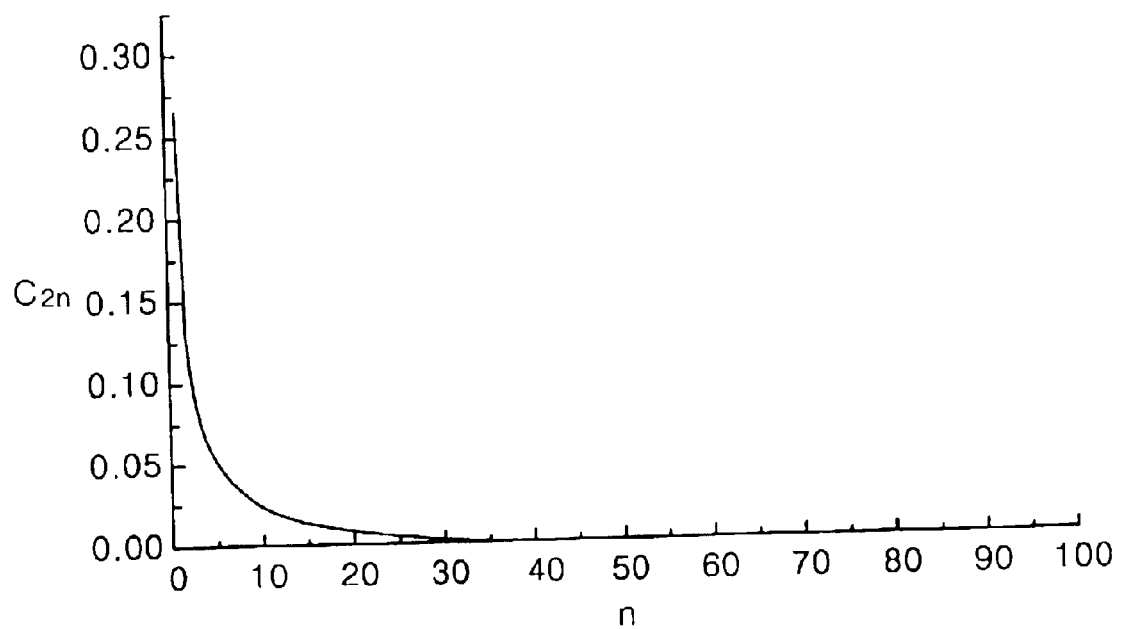
FIG. 10 is a graph showing the light mode intensity with respect to ratios of aperture diameters according to the second embodiment of the present invention.

FIG. 10 is a graph showing the mode constant $C_{2n}$ as a function of the mode number n. As can be seen from FIG. 10, the mode constant $C_{2n}$ increases remarkably when the mode number n is smaller than 10. Thus, an insignificant mode intensity q is obtained when the mode number n is greater than 10 with respect to the first order constant $c_0$.

Figure 11:
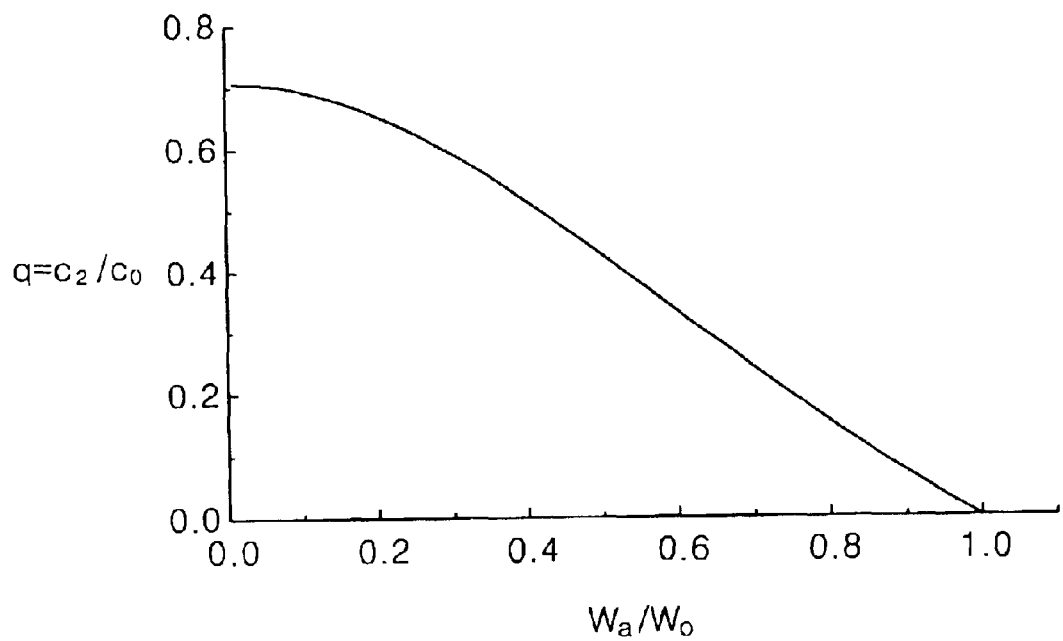
FIG. 11 is a graph showing the light mode intensity with respect to ratios of aperture diameters according to the second embodiment of the present invention.

FIG. 11 is a graph showing a ratio $C_2/C_0$ of the light mode intensity q as a function of the aperture diameter ratio $w_a/w_0$. As such if $w_a$ is zero, q is 0.7, and q becomes zero if $w_a$ becomes equal to $w_o$ since q reduces as $w_a$ gradually approaches $w_o$.

If the optical waveguide 39 according to the second embodiment of the present invention is a graded-index fiber, the filter 35b transmits only wavelengths in a Laguerre-Gauss mode.

Here, the graded-index fiber is an optical fiber where a refractive index of a core portion of the optical fiber becomes a smooth function with respect to a distance from the center in a cross-section. A refractive index n of the graded-index fiber is also given by equation 6.

A mode solution of the Laguerre-Gauss mode is given by equation 12.

$$\Psi(r, \Phi) = \left(\frac{r}{w_0}\right)^{m/2} L_p^m\left(2\frac{r^2}{w_0^2}\right) \exp\left(-\frac{r^2}{w_0^2}\right) \exp(im\Phi) \quad (12)$$

The first and second mode constants $c_0$ and $c_2$ from equation 12 are given by equation 13 as follows.

$$c_0 = \frac{2w_a w_0}{w_0^2 + w_a^2} \quad (13)$$

$$c_2 = \frac{2w_a w_0}{w_0^2 + w_a^2} \frac{w_0^2 - w_a^2}{w_0^2 + w_a^2}$$

The light mode intensity ratio q of the first and secondary orders $c_0$ and $c_2$ is given by equation 14.

$$q = \frac{|c_2|}{|c_0|} = \frac{w_0^2 - w_a^2}{w_o^2 + w_0^2} \quad (14)$$

The aperture diameter $w_a$ of the optical probe is then obtained by solving equation 14 as follows.

$$w_a = w_0 \sqrt{\frac{1 - q}{1 + q}} \quad (15)$$

Figure 12:
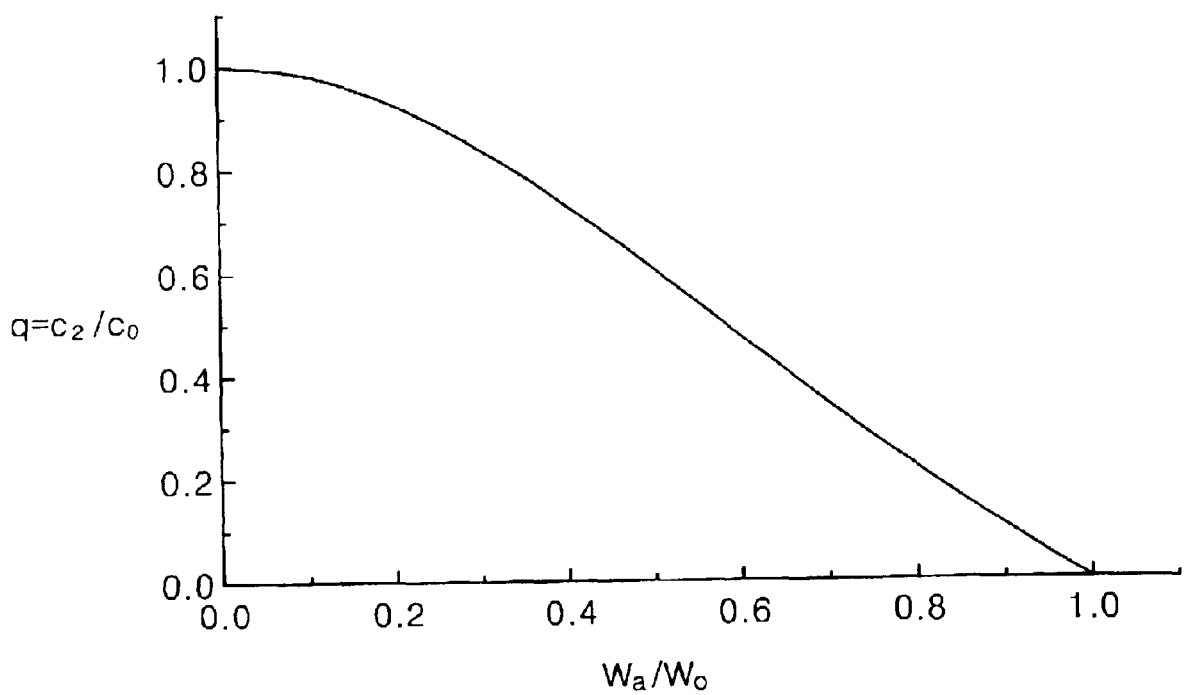
FIG. 12 is a graph showing the light mode intensity with respect to aperture diameters according to the second embodiment of the present invention.

FIG. 12 is a graph showing a mode intensity ratio q ($=c_2/c_0$) as a function with respect to the aperture diameter ratio $w_a/w_0$.

If the optical waveguide 39 is a step-index waveguide or a step-index fiber, the filter 35b transmits only wavelengths in a step mode.

Here, the step-index waveguide is a flat optical waveguide wherein a refractive index varies in the step form. The step-index fiber is an optical fiber wherein refractive indexes of core and clad are uniform, and the refractive index of clad is higher than that of core.

A mode solution of the step mode can be obtained from equation 16.

$$E_m(x,z) = A \cos k_1 x \exp(-i\beta_m z), m=0,2,\ldots E_m(x,z) = A \sin k_1 x \exp(-i\beta_m z), m=1,3,\ldots \quad (16)$$

where $\beta_m$ is a propagation constant, d is the thickness of the waveguide, $n_1$ is the refractive index of core, and $n_2$ is the refractive index of a cover.

Here, a horizontal spatial frequency $k_1$ is given by equation 17.

$$\frac{k_1 d}{2} = \arctan\frac{\gamma_2}{k_1} + \frac{m\pi}{2} \quad (17)$$

$$\frac{\gamma_2 d}{2} = \sqrt{(n_1^2 - n_2^2)\left(\frac{k_1 d}{2}\right)^2 - \left(\frac{k_1 d}{2}\right)^2}$$

The coupling constant cm satisfying equations 16 and 17 is given by equation 18.

$$|c_m|^2 \left| \frac{\int_{-d/2}^{d/2} E_y(x) E_{my}(x) dx}{\int_{-d/2}^{d/2} E_{my}^2(x) dx} \right| \quad (18)$$

Figure 13:
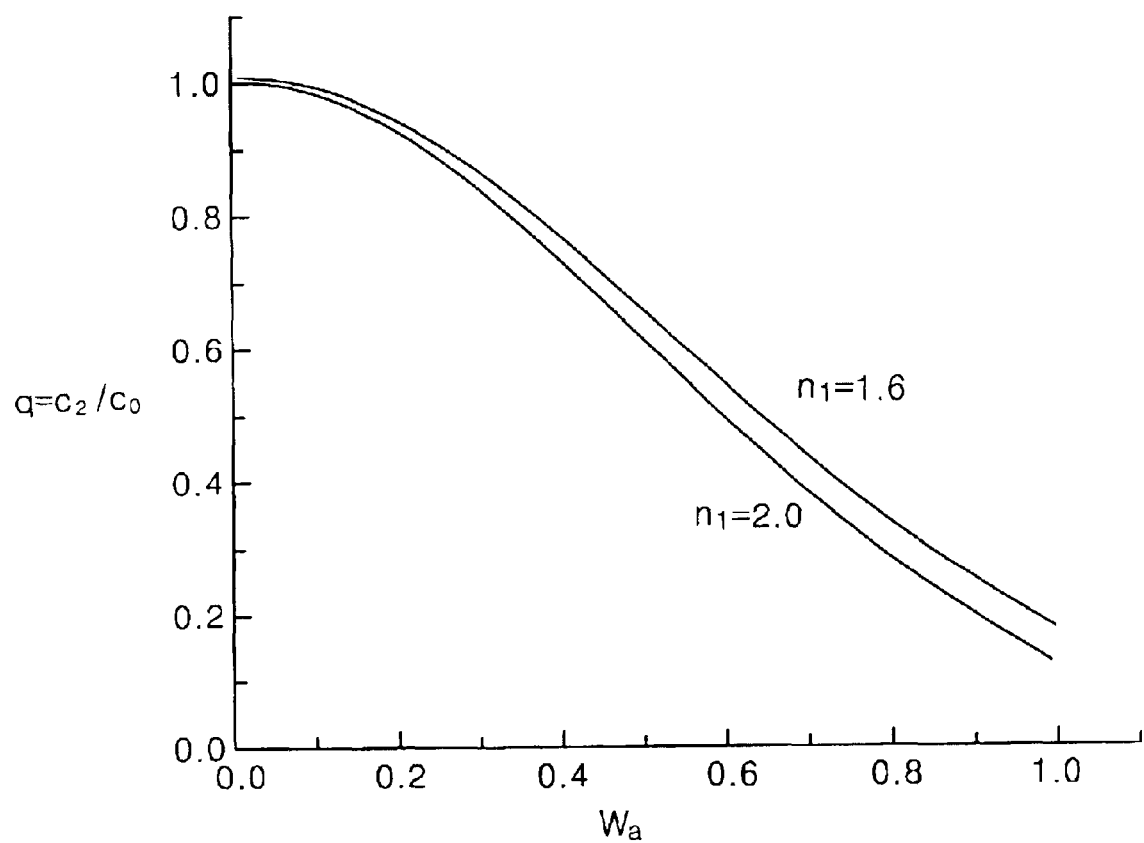
FIG. 13 is a graph showing the light mode intensity with respect to aperture diameters according to the second embodiment of the present invention.
Figure 14:
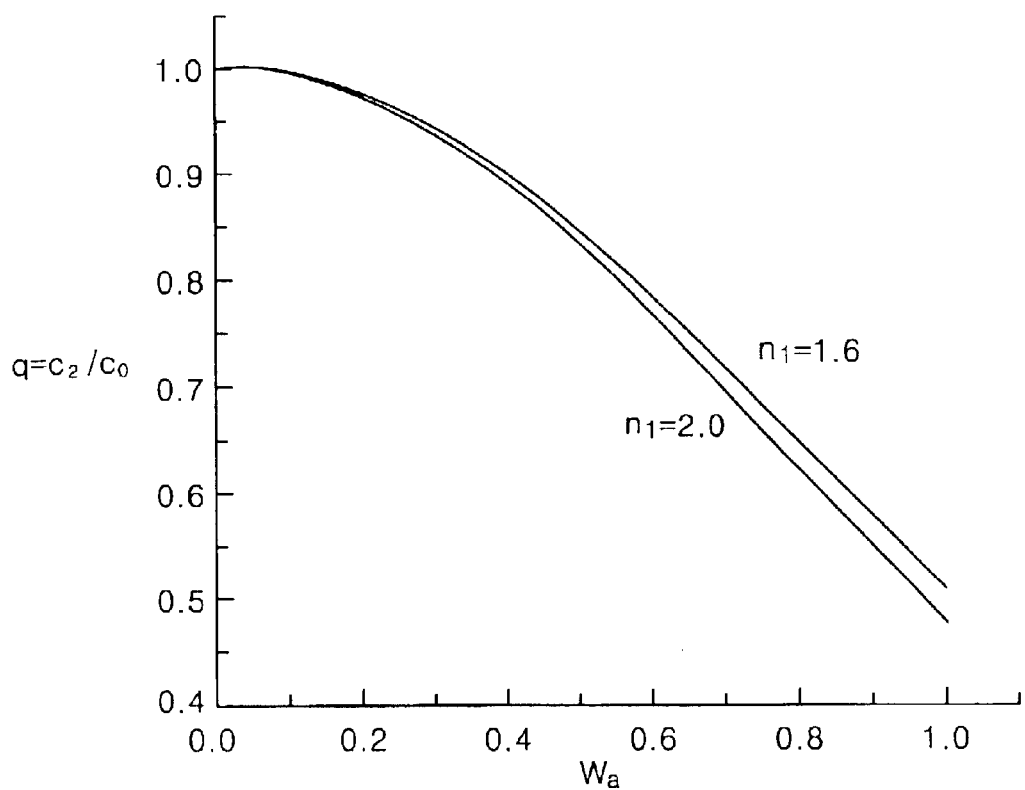
FIG. 14 is a graph showing light mode intensity with respect to aperture diameters according to the third embodiment of the present invention.

FIGS. 13 and 14 are graphs showing the mode intensity q with respect to aperture diameters $w_a$ of the step mode for different thicknesses of the waveguide. In FIG. 13, the thickness d of the waveguide is 3 μm, and in FIG. 14 the thickness d of the waveguide is 5 μm. When the refractive index n 2 of the cover is uniform and set to be 1.5, the refractive index $n_1$ of the core is 1.6 and 2.0, respectively. It can be seen that the slope when the refractive index $n_1$ of the core is 2.0 is slightly greater than the slope when the refractive index $n_1$ of core is 1.6.

A method of measuring the aperture size of the near-field optical probe using a filter for transmitting only wavelengths in a specific mode, using an apparatus for measuring the aperture of the optical probe according to the first or second embodiment of the present invention, includes the following steps: (a) radiating light having a predetermined wavelength toward the optical probe; (b) transmitting only light of wavelengths in a specific mode from the light transmitted through the optical probe, using the filter; (c) detecting a first light intensity value from a first far-field light intensity distribution of a wavelength having a mode number of 0 of the light transmitted through the filter; (d) detecting a second light intensity value from a second far-field light intensity distribution of a wavelength having another mode number not 0 of the light transmitted through the filter; and (e) substituting the first and second light intensity values in a predetermined equation for an aperture diameter of the optical probe to obtain the aperture diameter of the optical probe.

Step (e) includes: (e1) obtaining a mode solution corresponding to a specific mode according to a specific medium; (e2) calculating a coupling constant corresponding to the mode solution and obtaining relationship equation for the aperture diameter of the optical probe of the coupling constant; and (e3) substituting the first light intensity value measured in step (c) and the second light intensity value measured in step (d) in the equation to deduce the aperture diameter of the optical probe.

Figure 6:
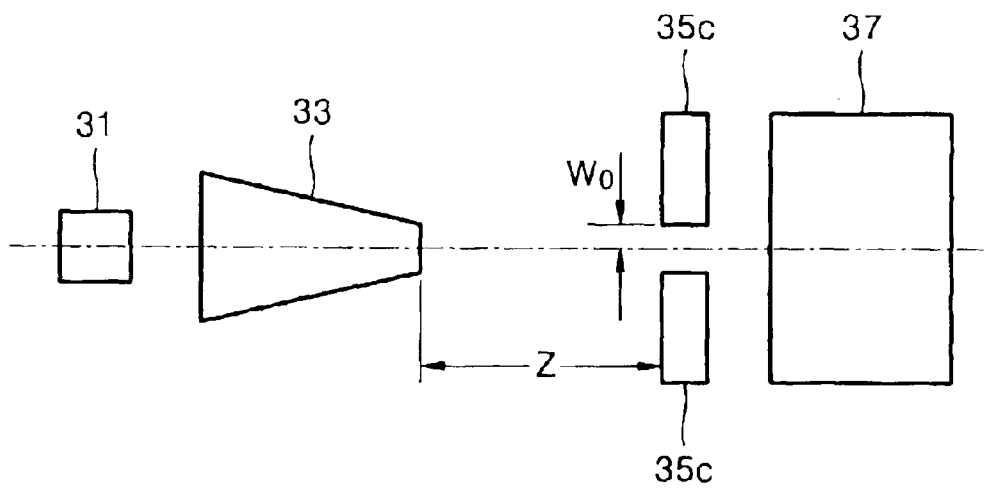
FIG. 6 is a schematic cross-sectional view of a third embodiment of the present invention.

FIG. 6 is a schematic cross-sectional view of an apparatus for measuring an aperture of an optical probe according to the third embodiment of the present invention. In the method of measuring the aperture diameter using the apparatus according to the first or second embodiment of the present invention, the mode intensity with respect to the aperture diameter is obtained. However, a method of measuring an aperture diameter in the apparatus according to the third embodiment determines the aperture diameter from a reduction ratio of light intensity of the optical axis with respect to the aperture diameter.

Referring to FIG. 6, the apparatus according to the third embodiment of the present invention includes a light source 31, an optical detector 37, and a filter 35c. The light source 31 radiates light toward an optical probe 33. The optical detector 37 is positioned before the optical probe 33 and receives the light transmitted through the optical probe 33 to detect light intensity. The filter 35c is positioned between the light source 31 and the optical detector 37, and transmits only light of wavelengths in a specific mode from the light transmitted through the optical probe 33. The filter 35c has a cavity in the center for transmitting a portion of the light.

Here, the light source 31 and the optical detector 37 are identical to those described in the first embodiment in view of their structure and function, and thus their descriptions are omitted.

The method of measuring the aperture diameter in the apparatus according to the third embodiment of the present invention includes the following steps: (a) radiating light having a predetermined wavelength toward the optical probe; (b) detecting a first light intensity value from a first far-field intensity distribution of the light transmitted through the mask; (c) detecting a second light intensity value from a second far-field intensity distribution of the light transmitted through the mask; and (d) substituting the first and second light intensity values in a predetermined relationship for the light intensity and the aperture diameter of the optical probe to obtain the aperture diameter of the optical probe. Here, the filter 35c has in the center the cavity with a size s of about 6 $\mu$m.

Figure 7:
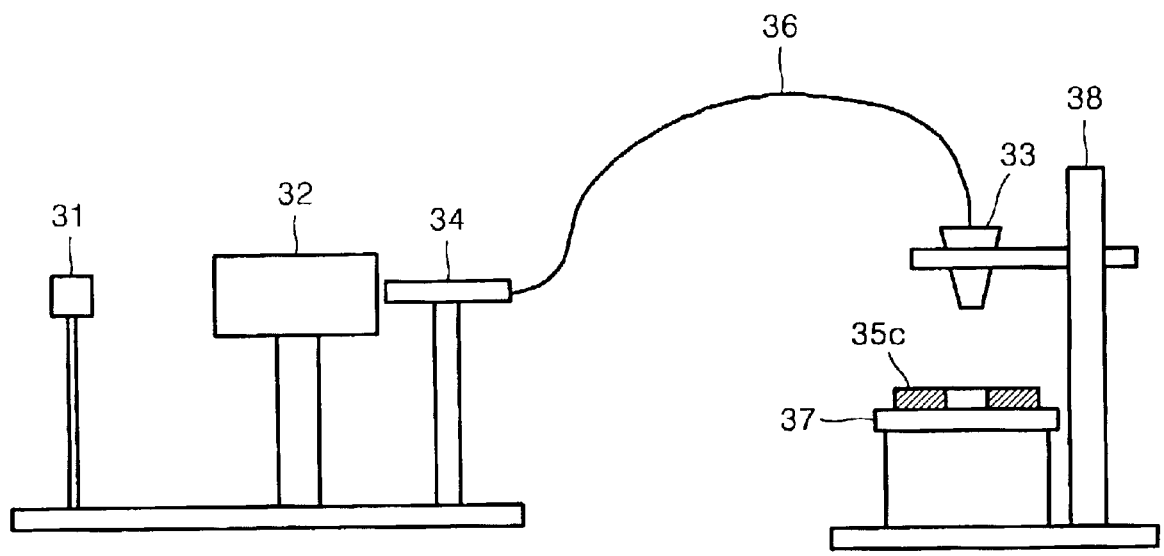
FIG. 7 is a configuration view of the apparatus for measuring aperture diameters according to the third embodiment of the present invention.

FIG. 7 is a configuration view of the apparatus for measuring the aperture diameter according to the third embodiment of the present invention. Referring to FIG. 7, light emitted from a light source 31 is transmitted to an optical probe 33 through a lens 32, a coupler 34, and an optical fiber 36. Specific wavelengths of the light transmitted through the optical probe 33, corresponding to a mask mode are emitted through the filter 35c having a cavity and transmitted to an optical detector to be detected. Here, reference numeral 38 is a stage where the optical probe 33, the filter 35c, and the optical detector 37 are installed.

Figure 15:
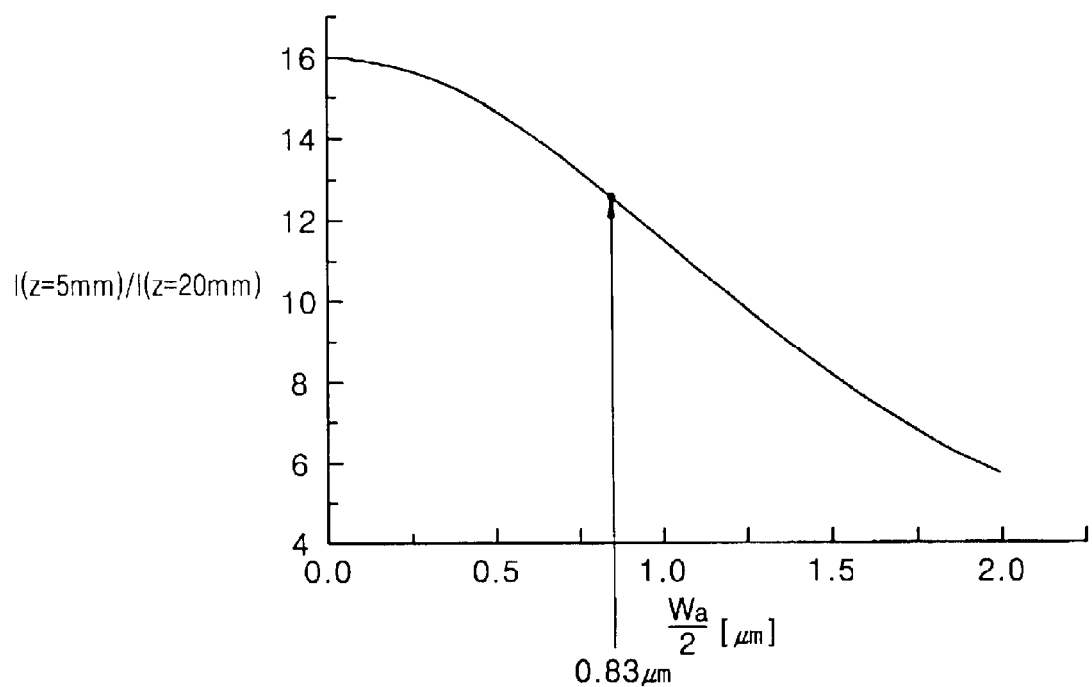
FIG. 15 is a graph showing output light intensities for different input light intensities with respect to distances from an optical probe, according to the third embodiment of the present invention.

FIG. 15 shows results of light intensity ratio obtained from an experiment made when the filter 35c is not prepared and output light intensity is 21.3 mW, a laser diode having a wavelength of 650 nm is installed as the light source 31, a current of 95 mA is applied, and the cavity of a filter has a rectangular size of 1.20 nm×1.01 nm. As can be seen from FIG. 15, in a case where light intensity ratio I when a distance z between the optical probe 33 and the filter 35c is 5 mm and 20 mm, respectively, is graphed with respect to the aperture diameter $w_a$ of the optical probe, the aperture diameter $w_a$ is 1.66 $\mu$m when the light intensity ratio I is 13.

Figure 16:
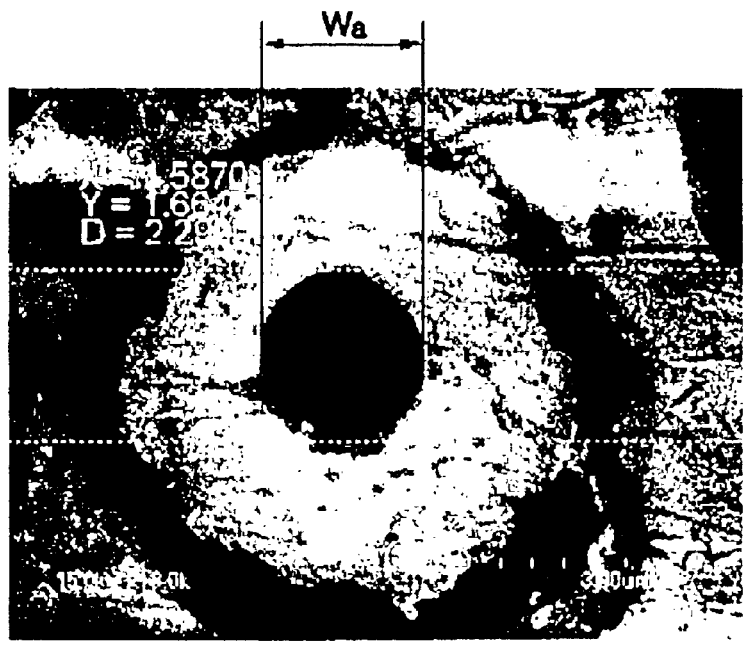
FIG. 16 is a view of an optical probe of an aperture diameter re-measured with an SEM where the aperture diameter was respectively measured with the aperture measuring apparatus according to the third embodiment of the present invention.

FIG. 16 shows an aperture diameter of an optical probe, which was measured with the apparatus according to the third embodiment of the present invention, and re-measured with an SEM. The aperture diameter of the optical probe shown in FIG. 16 is 1.62 $\mu$m, and almost corresponds to the aperture diameter of the optical probe measured with the apparatus according to the third embodiment of the present invention. This proves that the apparatus according to an embodiment of the present invention can measure accurately an aperture diameter.

Figure 17:
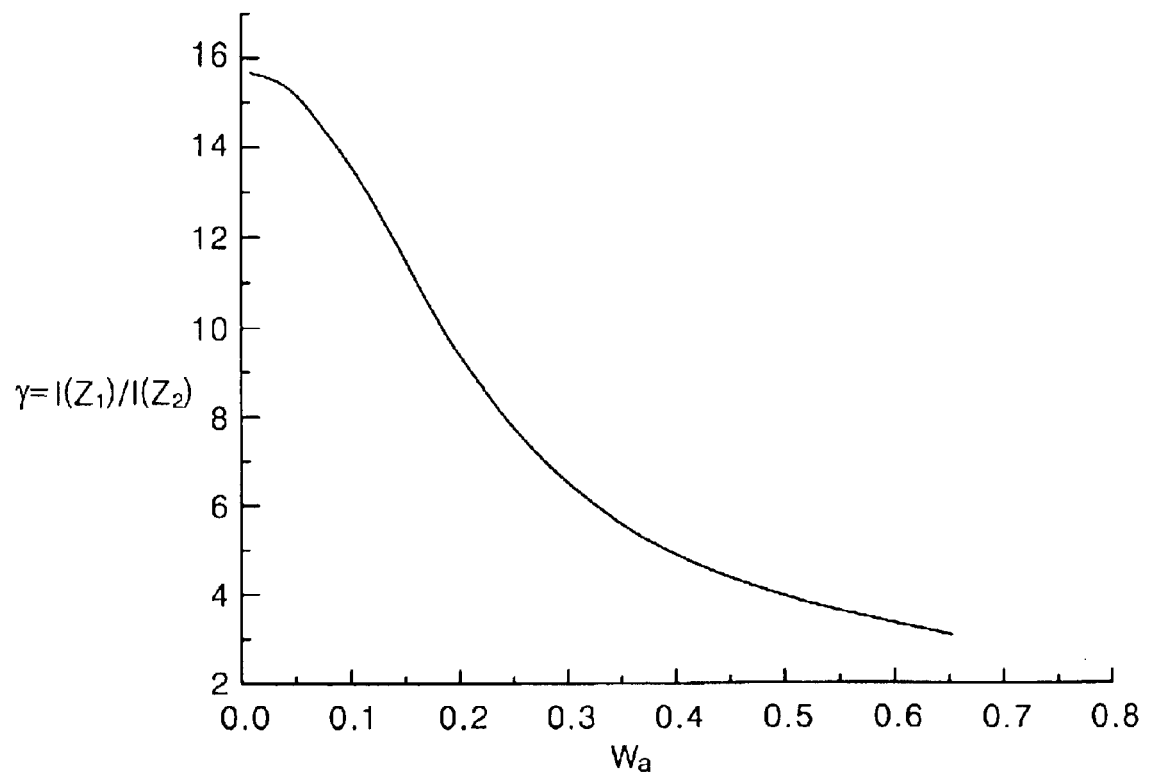
FIG. 17 is a graph showing relative ratios of light intensity with respect to aperture diameters.

FIG. 17 is a graph showing a relative light intensity ratio ($\gamma=I_2/I_1$) with respect to the aperture diameter $w_a$ when light intensities $I_1$ and $I_2$ are defined by equation 19. Here, the size of a cavity of a window is 6 $\mu$m and the distance z from an aperture of an optical probe to the window is 300 $\mu$m.

$$I_1 = \iint_s |E(x,y,z_1)|^2 dxdy$$
$$I_2 = \iint_x |E(x,y,z_2)|^2 dxdy \qquad (19)$$

Referring to FIG. 17, it can be seen that the light intensity ratio $\gamma$ decreases with an increase in the aperture diameter $w_a$, from the point when the aperture diameter $w_a$ is zero and the light intensity ratio $\gamma$ is about 15. For example, it can be seen that if the relative light intensity ratio $\gamma$ is 7, the aperture diameter $w_a$ of the optical probe is about 0.27 $\mu$m.

Figure 18:
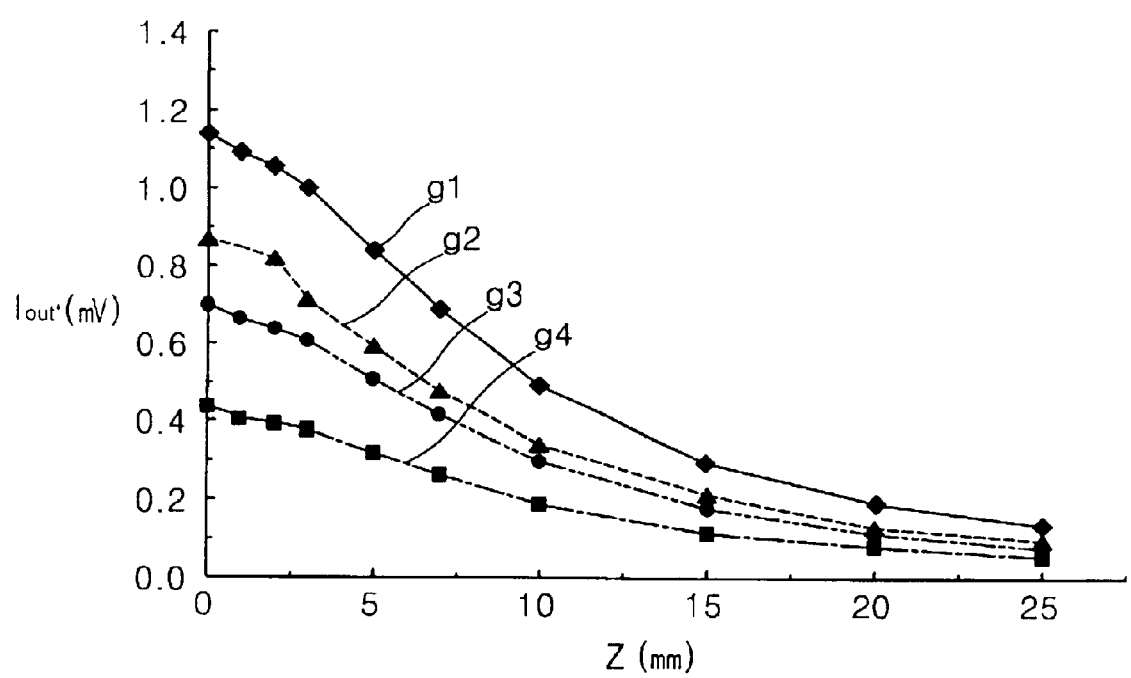
FIG. 18 is a graph showing output light intensities for different input light intensity using the apparatus of the present invention with respect to a distance from an optical probe to a window.

FIG. 18 is a graph showing output light intensity $I_{out}$ using the apparatus of the present invention, with respect to the distance z from the optical probe to the window, for different input light intensities. In this case, the window cavity has a size of 9 mm×9 mm. It can be seen that the greater the input light intensity is, the greater the output light intensity becomes. Here, g1 represents the greatest input light intensity, and g2, g3, and g4 represent decreased input light intensities. Also, from g1, g2, g3, and g4, it can be seen that the output light intensity decreases as the distance z increases, regardless of the input light intensity.

The embodiments described above must be interpreted as examples of preferred embodiments of the present invention and not as restricting the scope of the present invention. For example, one of ordinary skill in the art can prepare a predetermined optical device between an optical probe and an optical detector, and a filter according to the technical sprit of the present invention. Thus, the scope of the present invention must be defined by the appended claims and equivalents thereof, and not by the described embodiments of the present invention.

As described above, in the apparatus and method for measuring the aperture of the optical probe, the apparatus can be simply manufactured and the aperture diameter of the optical probe can accurately be measured without damaging the optical probe.

What is claimed is:

1. An apparatus for measuring an aperture of a near-field optical probe, the apparatus comprising:

a light source for radiating light to the near-field optical probe;

an optical detector which is positioned in front of the near-field optical probe, the optical detector receiving the light transmitted through the near-field optical probe to detect light intensity; and a filter which is disposed between the light source and the optical detector, the filter transmitting only light of wavelengths in a specific mode from the light transmitted through the near-field optical probe.

2. The apparatus of claim 1, wherein the specific mode is a Bessel Gauss mode.

3. The apparatus of claim 1, further comprising a medium which is disposed between the near-field optical probe and the filter and has a uniform refractive index.

4. The apparatus of claim 2, further comprising a medium which is disposed between the near-field optical probe and the filter and has a uniform refractive index.

5. An apparatus for measuring an aperture of a near-field optical probe, the apparatus comprising:
- a light source for radiating light to the near-field optical probe;
- an optical detector which is positioned in front of the near-field optical probe, the optical detector for receiving the light transmitted through the near-field optical probe to detect light intensity;
- a filter which is disposed between the light source and the optical detector, the filter transmitting only light of wavelengths in a specific mode from the light transmitted through the near-field optical probe; and
- an optical waveguide which is disposed between the near-field optical probe and the filter, the optical waveguide for transmitting the light.

6. The apparatus of claim 5, wherein the optical waveguide is a graded-index waveguide.

7. The apparatus of claim 6, wherein the specific mode is a Hermite-Gauss mode.

8. The apparatus of claim 5, wherein the optical waveguide is a graded-index fiber.

9. The apparatus of claim 8, wherein the specific mode is a Laguerre-Gauss mode.

10. The apparatus of claim 5, wherein the optical waveguide is one of a step-index waveguide and a step-index fiber.

11. The apparatus of claim 10, wherein the specific mode is one of a step-index waveguide mode and a step-index fiber mode.

12. An apparatus for measuring an aperture of a near-field optical probe, the apparatus comprising:
- a light source for radiating light to the near-field optical probe;
- an optical detector which is positioned in front of the near-field optical probe, the optical detector receiving the light transmitted through the near-field optical probe to detect light intensity;
- a filter which is disposed between the light source and the optical detector, the filter transmitting only light of wavelengths in a specific mode from the light transmitted through the near-field optical probe; and
- a mask which is disposed between the light source and the filter and has a cavity in the center through which the light passes.

13. The apparatus of claim 12, wherein the specific mode is a mask mode.

14. A method of measuring an aperture of a near-field optical probe using a filter for transmitting light in a specific mode, the method comprising:
- (a) radiating light having a predetermined wavelength to an optical probe;
- (b) transmitting wavelengths of light in a specific mode from light emitted from the near-field optical probe, using a filter;
- (c) detecting a first light intensity value from a first far-field light intensity distribution of light of wavelength having a mode number of zero from the light transmitted through the filter;
- (d) detecting a second light intensity value from a second far-field light intensity distribution of light of wavelength having a mode number not zero from the light transmitted through the filter; and
- (e) substituting a ratio of the first and second light intensity values in a predetermined equation with respect to an aperture diameter of the near-field optical probe to obtain the aperture diameter of the near-field optical probe.

15. The method of claim 14, wherein step (b) further comprises transmitting the light transmitted through the near-field optical probe to the filter through a predetermined medium.

16. The method of claim 15, wherein the predetermined medium has a uniform refractive index.

17. The method of claim 14, wherein the specific mode is a Bessel Gauss mode.

18. The method of claim 16, wherein the specific mode is a Bessel Gauss mode.

19. The method of claim 16, wherein the predetermined medium is a graded-index waveguide.

20. The method of claim 19, wherein the specific mode is a Hermite-Gauss mode.

21. The method of claim 16, wherein the predetermined medium is a graded-index fiber.

22. The method of claim 21, wherein the specific mode is a Laguerre-Gauss mode.

23. The method of claim 16, wherein the predetermined medium is one of a step-index waveguide and a step-index fiber.

24. The method of claim 23, wherein the specific mode is one of a step-index waveguide mode and a step-index fiber mode.

25. The method of claim 14, wherein step (d) comprises obtaining a second light intensity value from a second far-field light intensity distribution of a wavelength having a mode number of 2 from the light transmitted through the filter.

26. The method of claim 14, wherein step (e) comprises:
- (e-1) obtaining a mode solution corresponding to a specific mode according to a specific medium;
- (e-2) calculating a coupling constant corresponding to the mode solution and obtaining relationship equation with respect to the optical probe aperture diameter of the coupling constant; and
- (e-3) substituting a ratio of the first light intensity value measured in step (c) and the second light intensity value measured in step (d) for the relationship equation to deduce the aperture diameter of the near-field optical probe.

27. A method of measuring an aperture of a near-field optical probe using a mask with a cavity, the method comprising:
- radiating light having a predetermined wavelength to the near-field optical probe;
- detecting a first light intensity value from a first far-field light intensity distribution of the light transmitted through the mask;
- detecting a second light intensity value from a second far-field light intensity distribution of the light transmitted through the mask; and
- substituting the first and second light intensity values in a predetermined equation for light intensity and an aperture diameter of the near-field optical probe to obtain the aperture diameter of the near-field optical probe.

* * * * *